G. W. DUDLEY.
ADDING AND RECORDING MACHINE.
APPLICATION FILED APR. 3, 1908. RENEWED MAY 12, 1910.

975,023.

Patented Nov. 8, 1910.
6 SHEETS—SHEET 1.

Attest:
Edw L. Tolson
Bent M. Stahl

Inventor
George W. Dudley
By Spear, Middleton, Donaldson & Spear
Attys.

G. W. DUDLEY.
ADDING AND RECORDING MACHINE.
APPLICATION FILED APR. 3, 1908. RENEWED MAY 12, 1910.

975,023.

Patented Nov. 8, 1910.
6 SHEETS—SHEET 4.

Attest:
Ewd L. Tolson
Bent McFale

Inventor
George W. Dudley
By Spear, Middleton, Donaldson & Spear
Attys.

UNITED STATES PATENT OFFICE.

GEORGE WILSON DUDLEY, OF STAUNTON, VIRGINIA, ASSIGNOR, BY MESNE ASSIGNMENTS, TO DUDLEY ADDING AND BILLING MACHINE COMPANY, OF DELAWARE.

ADDING AND RECORDING MACHINE.

975,023. Specification of Letters Patent. Patented Nov. 8, 1910.

Application filed April 3, 1908, Serial No. 424,950. Renewed May 12, 1910. Serial No. 560,986.

*To all whom it may concern:*

Be it known that I, GEORGE WILSON DUDLEY, citizen of the United States, residing at Staunton, Virginia, have invented certain new and useful Improvements in Adding and Recording Machines, of which the following is a specification.

The present invention relates to adding and recording machines and is a development of the invention disclosed in Letters Patent of the United States granted to G. W. and A. L. Dudley November 4, 1902, No. 712,777.

The present improvement relates to means for correcting or eliminating an erroneous selection of a figure or digit by the operator, whereby the selector wheels, although set by the operation of the keys ready to transfer their movement to the adding disks, may be thrown out of gear with said number wheels and returned to normal position without having any effect on said number wheels.

Another feature of improvement consists of means for limiting the movement of the selector wheels according to the denomination of the key operated.

A further feature relates to a compensating or yielding connection between the figure keys of the typewriter or recorder and the keys of the adding machine.

Other features of improvement will be referred to hereinafter and particularly pointed out in the claims.

In the accompanying drawings, Figure 1 is a plan view of the machine embodying the invention. Fig. 3ª is a view of a detail. Fig. 5 is a detail view of the accumulator mechanism. Fig. 6 is a detail view of the selectors in section and the stop mechanism associated therewith. Fig. 6ª is a detail. Figs. 7 to 11 are detail views. Fig. 11ª is a view of a detail.

In these drawings, 1 indicates the number wheels or adding disks, each of which has a gear 2 which meshes with transmitting gears 3 on a shaft 4, supported in the frame 5 of the accumulator mechanism. These transmitting gears are arranged to be engaged by toothed selector wheels 6, which, as a group, lie to one side and at the right of the transmitting gears when the machine is in normal condition or ready for operation by pressing the keys. This relation of the parts is shown in Figs. 1 and 3.

The selector wheels are supported on a shaft 7, supported in the standards 8, 9, of the frame. As a group they are adapted to move axially, for which purpose they are confined between brackets 10 attached to the rack-bar or carrier 11, which is driven by a gear 12 of a spring drum 13 which is controlled by escapement mechanism, in turn controlled by the adding keys, as will be hereinafter described.

Figures 1, 9, 11A:
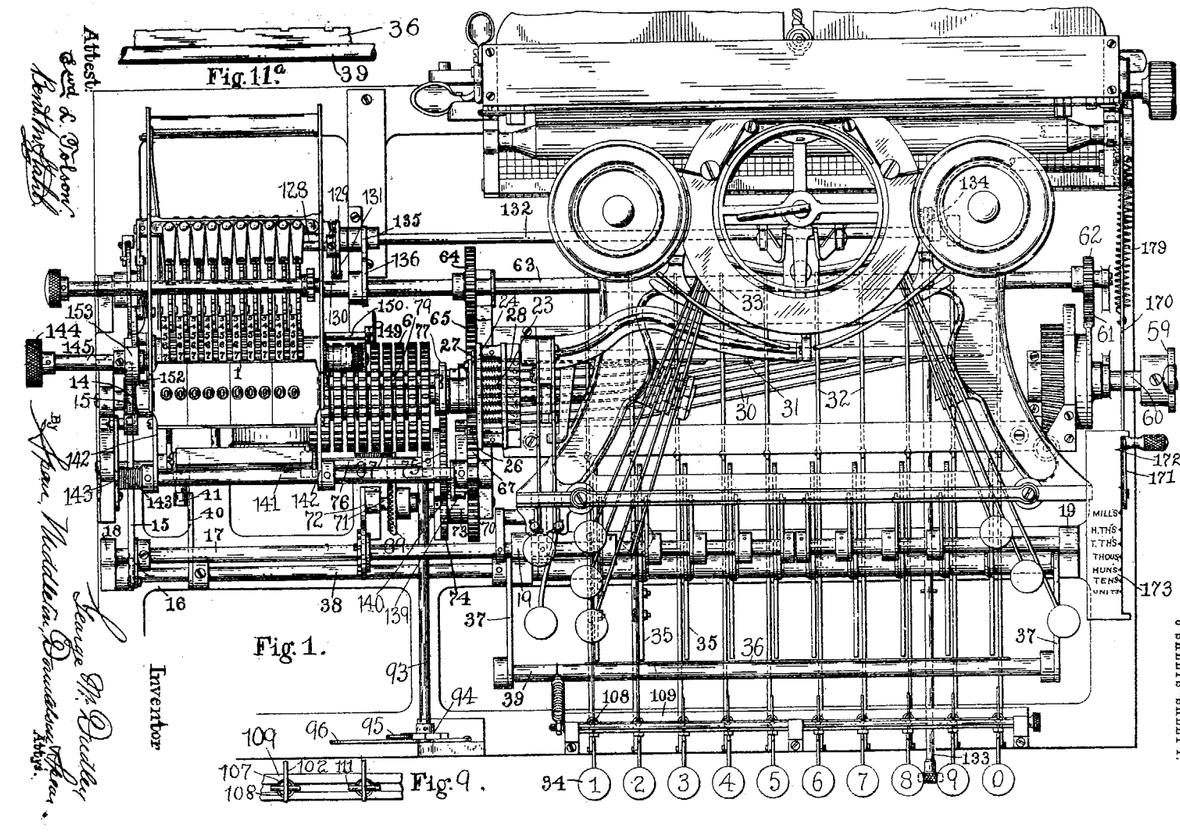
Figure 3:
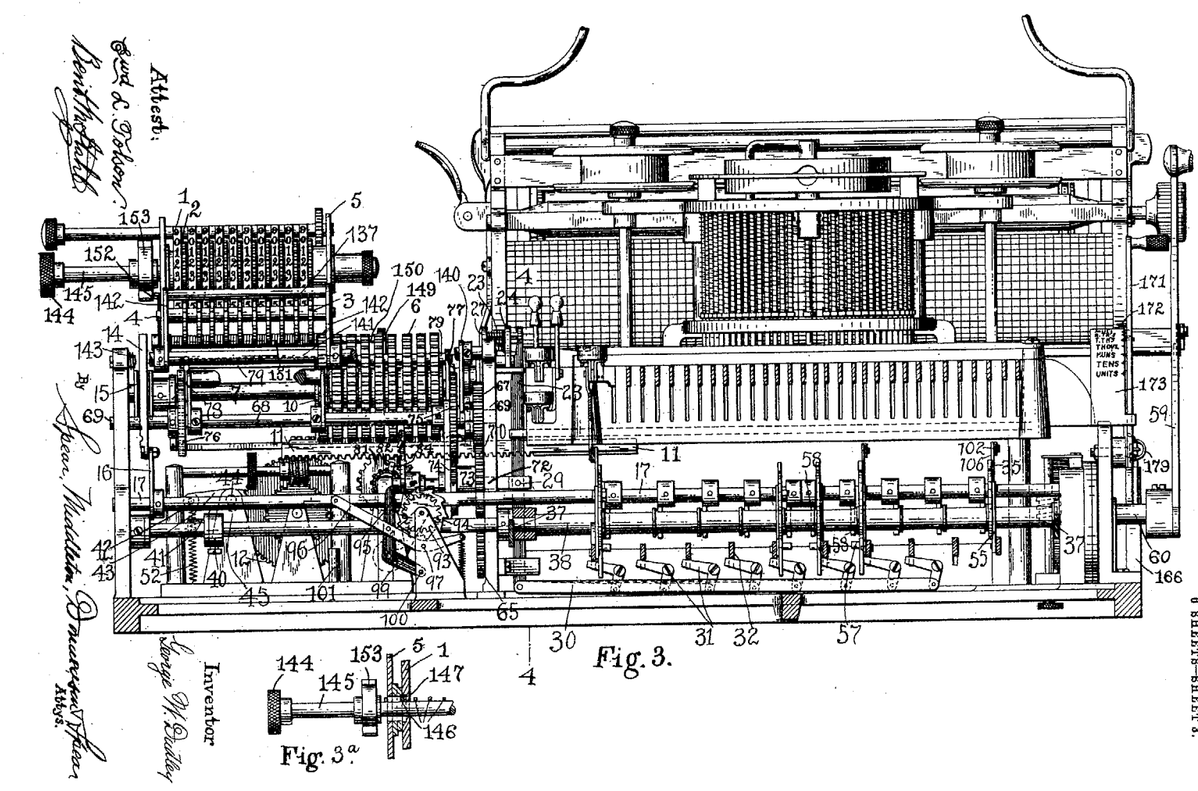
Fig. 3 is a front view of the machine with parts of the key connections omitted and parts in section.
Figures 5, 10, 11:
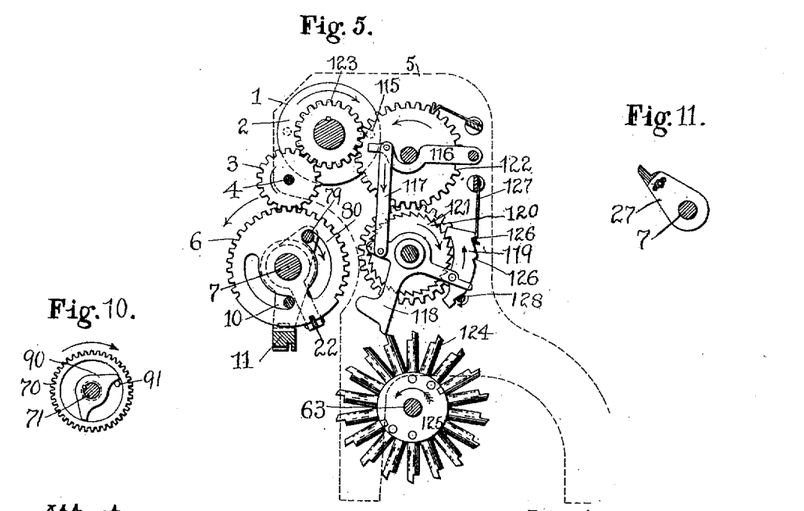
Figures 6, 8:
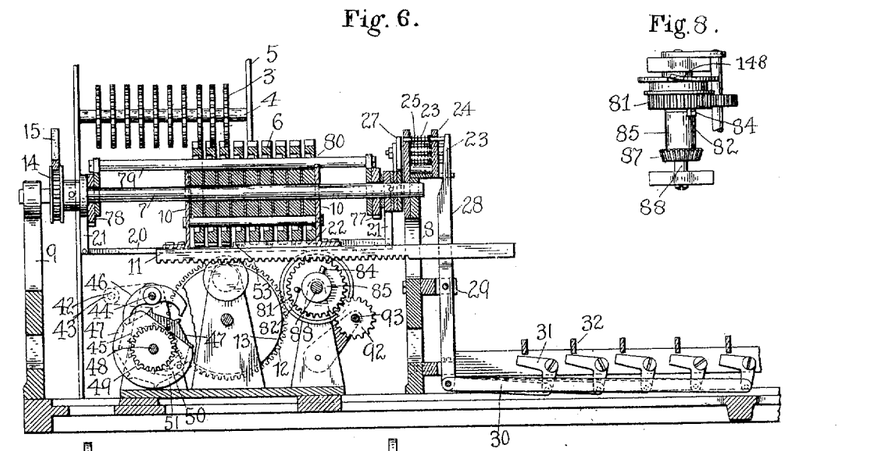
Figures 6A, 7:
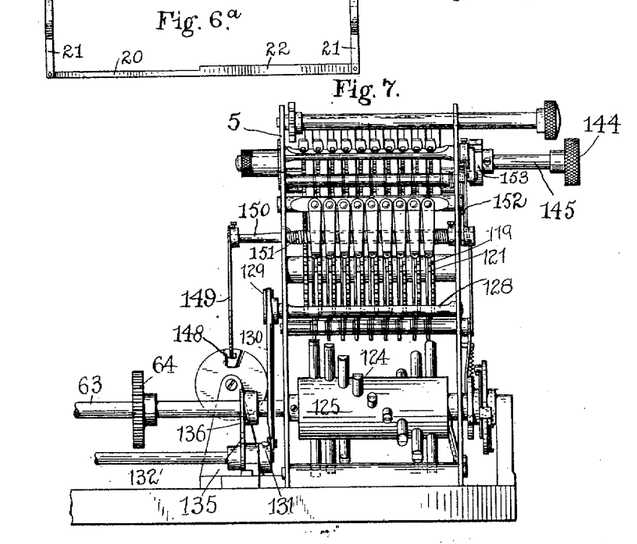
Figure 12:
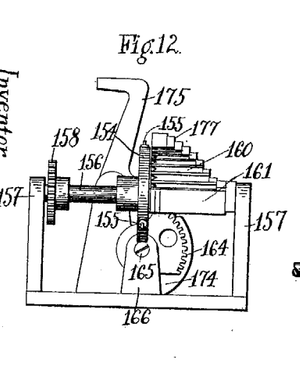
Figs. 12 to 15 are views of the tabulator.
Figure 13:
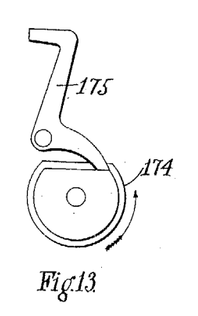
Figures 14, 15:
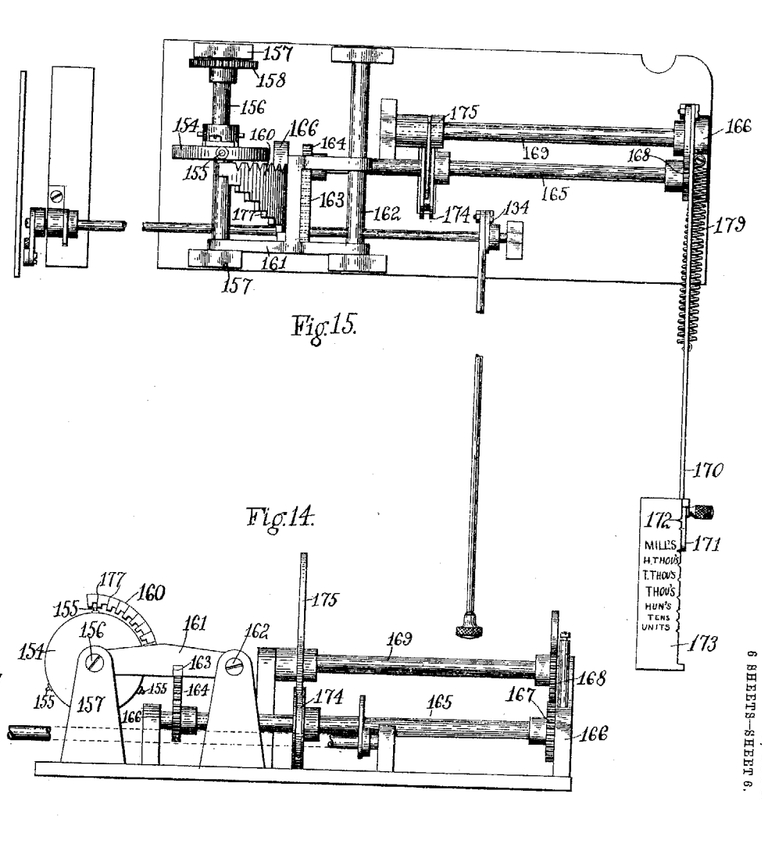

The shaft 7 is rotated to turn the group of selector wheels, through arcs corresponding in degree to the value of the adding key operated, by means of a gear 14, fixed thereon, Figs. 1, 3 and 6 and a rack-bar 15 pivotally connected to an arm 16 fixed to a shaft 17 journaled in the frame at 18 and 19, and operated each time one of the adding keys is operated excepting the 0 key. The rock-shaft 7 has a spline bar 20 fixed thereto by arms 21 and the wide part 22 of this spline bar engages a notch of the selector wheels as shown in Figs. 5 and 6, so that when the group of selector wheels is in the position shown in Figs. 1 and 3, all of them will be engaging the wide part of the spline bar and upon a depression of any adding key the whole group will rotate forwardly in the direction of the arrow Fig. 5, due to the spline bar rotating with the shaft. The degree of rotary movement corresponds to the value of the key operated, for instance, if the 1 key is operated the group of selectors will rotate through an arc equal to one tooth and if the "nine" key is operated the selectors will rotate through an arc equal to nine teeth.

For stopping the rotary movement of the shaft 7 and of the selectors accurately in position in accordance with the value of the adding key operated, a series of stop pins 23 are employed, arranged in the arc of a circle and slidably mounted in the stop frame 24, supported on the main frame of the machine. These stop pins are held in retracted position by springs 25, and there is one for each of the keys from 1 to 9 of the adding machine, the pin 26 for the key 9 being fixed in the stop frame and projecting always into the path of the stop arm 27, rigidly connected with the shaft 7 of the selectors. The slidable stop pins are projected into the path of said stop arm by vertical levers 28 pivoted to the frame at 29 and operated by links 30 extending horizontally under the key levers of the machine where they connect with bell crank levers 31 pivoted to the frame and having their arms extending beneath the key lever 32 of the adding keys, which levers extend rearward and are pivoted to the frame at 33. There is one of these bell crank levers for each key of the adding machine excepting the 9 and 0 keys, and the keys of the adding mechanism are shown at 34 in Fig. 1.

Supposing, for instance, the 8 key is depressed, it will operate the bell crank lever belonging thereto and this, through the link 30 and the appropriate vertical lever 28 will project the proper stop pin so that as the stop arm revolves it will strike the said pin and as the selectors, held by the spline bar, move with the shaft 7 to which the stop arm is fixedly connected, the said selectors after rotating through the proper angle will be arrested accurately in position with their teeth in line with the spaces between the teeth of the transmitting gears 3 ready to engage therewith when shifted axially along the shaft 7. This shifting movement of the selectors takes place as a result of the full depression of the key and is due to the lever 35, which is connected to and moves with the key lever, striking a space bar 36 Fig. 11ª. This space bar is carried by a frame composed of the arms 37 fixed to a shaft 38 suitably journaled in the frame, the said arms also carrying at their free ends a rod 39 to which the space bar 36 is attached.

The shaft 38, on rotating, as a result of the final downward movement of the key moves an arm 40 fixed thereto which carries a stud 41, which strikes the stud 42 of an arm 43 fixed on the shaft 44 of the escapement mechanism. This shaft is journaled in bearings 45 of the frame and has fixed thereto a double toothed pallet 46 which coacts with an escape wheel 47 loose on the shaft 48 also journaled in the bearings 45, said escape wheel having fixed thereto a ratchet wheel 49 with which engages a pawl 50 on a disk 51 fixed on the escapement shaft.

The arrangement of the parts described is such that the spring in the spring drum through the gearing 12 and 49 tends to rotate the pawl disk to the right with the escapement wheel but this movement is prevented by the pallet 46 engaging the tooth of the escapement wheel, the pallet being held normally in this position by a spring 52 attached to the frame at one end and to the arm 43 of the pallet shaft at the other end. When now, the selectors have been rotated forwardly through the proper angle and have been accurately arrested by the proper stop pin, and the key is completing its movement the space frame will be depressed, thus lifting the arm 40 and turning the pallet shaft so that its left hand tooth, Fig. 6, will release the escapement wheel which will therefore release the spring drum allowing the same to turn and through the carrier rack 11 move the whole group of selectors to the left, Figs. 1 and 3, so that the one at the extreme left will engage the first transmitting gear wheel 3, i. e. the one at the right of the group, Figs. 1 and 3, and the pallet by its right hand tooth engaging the escapement wheel will limit the movement, and on the release of the key the pallet and escapement mechanism will resume their normal positions ready for another operation, the operation just described having shifted the group of selectors to the left one step.

It will be observed that the selectors are loose on the shaft 7 and are free to shift along it. As a result of the shifting one step, just described the selector at the left of the group has disengaged itself from the spline bar 22, which it will be observed is cut down or shouldered at 53 so that when the selector has shifted to the left, past this shoulder it is no longer connected with the shaft so far as rotation is concerned and therefore it will remain in its advanced or forward position to which it has been rotated even after the key is released, for it is now in engagement with the transmitting gear 3. On the release or rise of the key however all the other selectors, which lie to the right of the shoulder 53, and are therefore still engaging the spline bar with the teeth are rotated back to normal position, this returning movement being due to the action of the springs 54 connected to the frame and to the key levers. The rotary movement of the shaft 7 is due to the action of the keys 32 which are connected by links 55 with the levers 35 loose on the shaft 38, which levers have each a pin 57 arranged to strike an arm 58 fixed on the shaft 17 before mentioned, which transmits its movement to the selector shaft 7 through the rack and gear 15, 14, before described.

Figure 4:
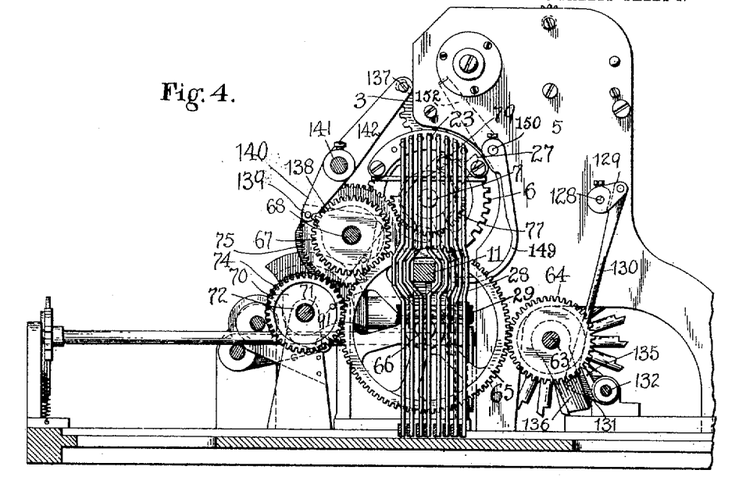
Fig. 4 is a sectional view substantially on the line 4—4 of Fig. 3.

I have now described how the selector wheels are rotated forwardly upon the depression of any of the keys from 1 to 9; how this rotary movement is accurately arrested as a result of depressing the keys; how the selector carriage or rack then shifts to the left as the key completes its downward movement so that the selector at the left of the group will engage the first transmitting wheel leading to the adding disks and how on the release of the key all the selectors not engaging the transmitting gears are returned to normal position with the spline bar and shaft 7, leaving the engaged selector in advanced position because in engaging the transmitting gear 3 it has disengaged itself from the spline bar and consequently from the shaft 7, and the key so far as rotating movement is concerned. Supposing now another key, or in fact the same key is depressed, a similar series of actions take place, the remaining selectors of the group, that is excepting the one engaging the transmitting gear, will be advanced and will shift another step to the left, thus making the previously advanced selector engage the second transmitting gear of the group and causing the second selector to engage the first transmitting gear and upon release of the key these two selectors will remain in their advanced or forward position and in engagement with the two transmitting gears, while all the other selectors will rotate back to normal position. These actions are repeated until all the keys corresponding to the digits of the number are operated and the selectors have rotated through the different angles corresponding to the values of the keys depressed and have gotten into engagement with the transmitting wheels, whereupon the machine is ready to be operated to transfer these values or register them on the adding disks. For this purpose it is simply necessary to rotate all advanced selectors back to normal position, whereupon that selector which had been set or rotated forward, for instance three teeth or spaces, and that which had been rotated or set in advance rotatively five spaces and the one which had been set forward seven spaces, owing to the depression of the 3, 5 and 7 keys, will, in returning to normal position, rotate the transmitting gears 3 through angles corresponding respectively to the angles or degrees that the respective selectors have been advanced, namely, one through the space of three teeth, one five teeth and the other seven teeth, and this movement will be transmitted to the number disks 1 and they will register the values of the operated keys. This return to normal position of the engaged selectors is due to the operation of the handle 59 at the right of the machine, the shaft 60 of which has a segment 61 meshing in a gear 62 fixed on a shaft 63 journaled in the frame, which shaft has also fixed thereto a gear 64 meshing with a master gear 65 journaled at 66 in the frame, said gear in turn meshing with a gear 67 loose on a shaft 68, journaled at 69 in the frame. The gear 65 meshes also with a gear 70 loose on a shaft 71 having its bearings at 72 in the frame posts. This gear 70 is fixed to a drum 73 having a segment 74 fixed thereto, meshing with a gear 75 fixed on the shaft 68 before mentioned. This shaft also has a toothed segment 76 fixed thereto which is shown at the left of Fig. 3. The gear 75 and the segment 76 mesh respectively with toothed segments 77, 78, Figs. 3 and 4, which are loosely mounted on the shaft 7 of the selectors. These segments are connected by a selector returning bar or rod 79 which passes through slots or openings 80 in the selectors. Now when the handle 59 is drawn forward after more or less of the selectors are set into engagement with the transmitting wheels 3 the return or pick up bar 79, through the described train of gearing, will be moved in the arrow direction Fig. 5 and striking the end of the slot 80 of these selectors which have been advanced from normal position, will return those selectors to normal position and in this movement the transmitting gears 3 will be turned to register the values on the number disks according to which keys were operated.

The above described movement of the selectors are substantially the same as those described in the patent above referred to, the arrangements for arresting the rotary movement of the selectors accurately being however, an improvement upon the invention disclosed in said patent. In addition to the movement imparted to the selectors by the operation of the handle, as above described, the said handle, as in the patent referred to, in the final part of its forward movement returns the group of selectors to the right or into disengaged position. For this purpose I employ a gear wheel 81 Figs. 3 and 8 having a pin 82 projecting from its face arranged to be struck by a pin 84 on a sleeve 85, which sleeve carries a beveled pinion 87, the said sleeve and pinion being fixed to each other and being free to rotate on a shaft or pin 88 bearing in suitable posts of the frame. This beveled pinion is engaged by a segmental beveled gear 89 fixed on the shaft 71 before mentioned. This shaft, as before stated, has thereon the gear 70 and drum 73 carrying them loosely. The shaft has fixed thereto an arm 90 Fig. 10 arranged to be struck by a pin 91 on the gear 70 so that this gear may have a considerable movement before the pin strikes the fixed arm of the shaft. This construction permits the above described setting up action of the selectors to be performed during the first part of the movement of the hand lever, and when this setting up action has been completed the pin 91 of the gear wheel 70 will strike the fixed arm 90 and thus turn the shaft 71, and through the bevel gearing and the pins 82, 84 the gear 81 will be rotated and as this meshes with the rack 11 carrying the selectors the whole group of selectors will be returned to disengaged position at the right of the accumulator mechanism as shown in Figs. 1 and 3. This returning movement to disengaged position is substantially the same as that described in the patent above referred to.

*Correcting or eliminating mechanism.*—An important improvement in the present machine relates to means for correcting or eliminating a mistake of the operator without transmitting the same to the accumulator mechanism. That is to say, should the operator have struck the keys incorrectly and the selectors have become engaged with the transmitting gears, it is possible by my present improvement to return these selectors to their disengaged position without transmitting their value to the number wheels. For this purpose I employ a gear 92 on a shaft 93 suitably journaled in the frame, said gear meshing with the gear 81 before mentioned, which in turn meshes with the rack or carrier bearing on the selectors. The shaft 93 has at its front end a toothed wheel 94, and arranged to engage this is a pawl 95 pivoted to a finger lever 96 which is pivoted at 97 to the post 98. The pawl is also pivotally connected with a link 99 which is pivoted at 100 to the said post 98. Now by depressing the finger lever 96, supposing for instance that the selectors have moved into the position shown in Fig. 6 wherein three of the selector disks are in engagement with the transmitting gears 3, it will be seen that the pawl 95 by engaging the toothed wheel 94 will turn the shaft 93, and through the gearing described, will move the rack bar 11 toward the right. This movement is limited so that the selectors which were engaged with the transmitting gears 3 will occupy positions opposite the spaces between said gears and then by operating the handle 59 the selectors will be first returned to normal position by the pick-up or return bar without setting up or transferring their movement to the transmitting gears and number wheels and then the continued movement of the handle 59 toward the front will return the whole group of selectors to disengaged position at the right.

For limiting the movement of the finger lever 96 I employ a suitable stop as 101. It will be observed that the employment of this correcting or eliminating device enables the operator after he has caused the selectors to engage certain of the transmitting wheels to free the said selectors therefrom and to return them to normal position and to disengaged position without in any way affecting the transmitting gears 3 or setting up the values on the number disks.

As shown in Fig. 3 the position of the pins 82, 84 which cause the return movement of the selectors, is such as will permit the use of the correcting or eliminating mechanism. For it will be noticed Figs. 3 and 8 that with the selectors in disengaged position the pin 82 of the gear wheel lies against the left side of the stud or pin 84 of the sleeve and the step by step movement of the selectors to the left carries this pin 82 away from the pin 84 as in Fig. 6, so that the parts are free to be moved toward the right upon the depression of the finger lever 96. This movement is only sufficient to disengage the selectors from the setting up train or transmitting gears, and upon the operation of the handle 59 the stud 84 revolves toward the right from the position shown in Fig. 3, and by striking the left side of the stud or pin 82 it returns the same to position shown in Fig. 3, and then upon the return of the hand lever 59 to its normal position toward the rear of the machine the stud 84 will revolve toward the left and get into normal position indicated in Fig. 3.

Figure 2:
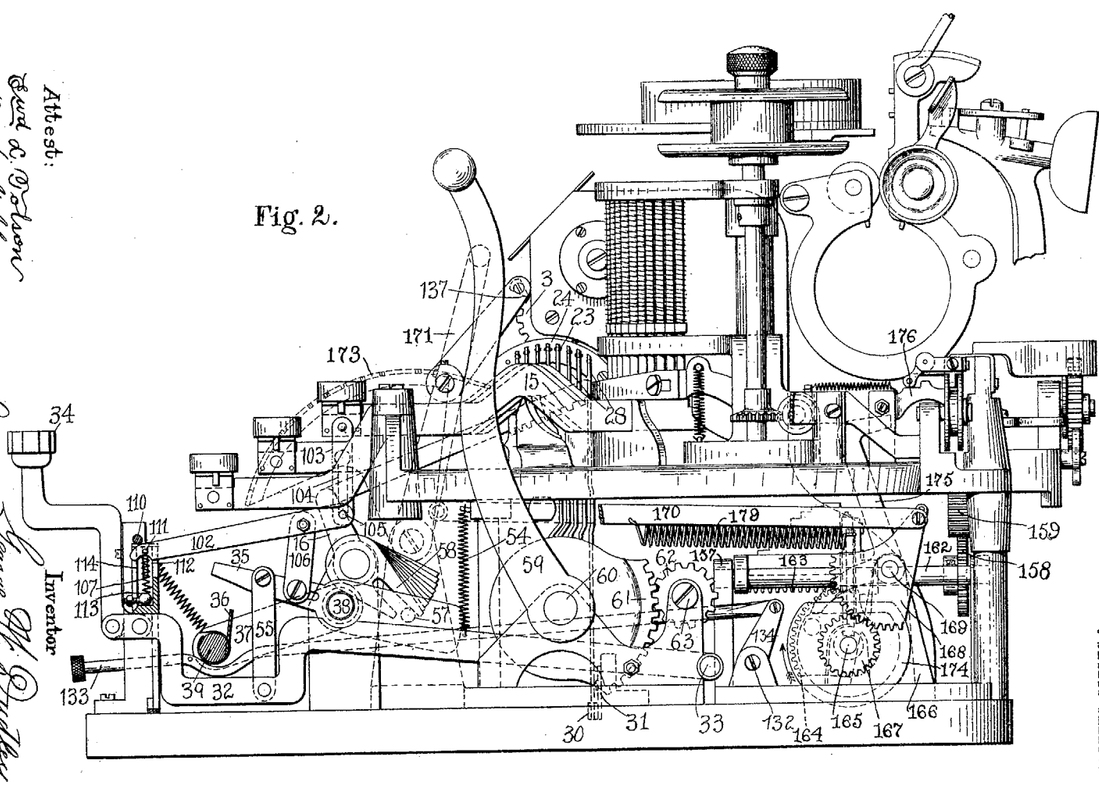
Fig. 2 is a side elevation of the machine with parts in section and parts omitted.

*Recorder mechanism.*—For recording the numbers set up on the number disks, I employ a typewriter of substantially the form well known, as the Hammond, this being superimposed upon the portion of the adding machine above described. The number keys of the adding mechanism are connected with the number keys of the typewriting or recording mechanism by levers 102 which are pivotally supported at their front ends in the frame of the machine, as will be hereinafter described, and at their rear ends are connected with the figure levers of the typewriting or recording machine by links 103, which are slotted at 104 to receive the pins 105 of the levers 102. The levers 102 derive their movement through links 106 from the levers 35 above described. It will be observed from Fig. 2 that upon depression of one of the keys 34 of the adding mechanism the lever 102 corresponding thereto will be swung downwardly through the power transmitted thereto by the link 55, lever 35 and link 106 and this downward movement of the lever 102 will, through the pin 105, be communicated to the link 103 and thus to the lever of the typewriter or recording mechanism corresponding in denomination to the lever 34 of the adding mechanism will be operated to cause the recording on the bill or paper sheet of the digit or number corresponding to the key of the adding mechanism depressed.

The pin and slot construction 104, 105, while causing the operation of the typewriter key will permit an independent action of the typewriter key, that is without affecting the adding mechanism, this being desirable in making out bills or other matter.

I provide a compensating means for the connection between the adding key lever or recording typewriter and key lever so as to insure certainty of operation and to render negligible any irregularities or inaccuracies in the fitting or adjustment of the levers in respect to each other. For this purpose I support the forward ends of the levers 102 upon springs 107 arranged in sockets 108 of the frame bar 109. These levers are held in place by a rod 110 extending across their ends and suitably fixed in the frame. The levers are provided with laterally extending pins 111 which are movable in the guideways 112 in the frame and the pressure of the spring is such as to hold the lever up against the bar 110. The tension of the spring may be regulated by adjusting the bolt 113 up or down in the slot 114 of the frame, said bolt carrying an enlarged spherical head upon which the spring rests. By means of this spring a yielding bearing is provided for the lever 102, so that should any inaccuracies exist in the relation of the parts this lever will yield to compensate therefor, and it will thus insure the operation of the typewriter lever each time the adding key lever is operated. The adding key lever may have a certain amount of excess movement to insure the operation of the recording key lever, any further movement which takes place after the recording or typewriting lever is operated being taken up by the spring bearing of the lever 102.

*Carrying mechanism for accumulators.*—This mechanism consists substantially of the same elements as disclosed in the patent above referred to.

A pin 115 on the number disk, for instance the units disk will be brought against the end of the carrying lever 118 of the tens disk when the units disk has rotated to the point where it is to carry on to the tens number wheel. This carrying lever is depressed by this pin and through a link 117 it turns a lever 118 which carries a pawl 119 engaging a ratchet wheel 120 which has fixed thereto a carrying wheel 121 meshing with an intermediate gear 122 which meshes with the gear 123 of the tens disk. The lever 118 when moved as described, by the link 117, has its depending arm in the path of one of the pins or arms 124 on a carrying drum 125. This drum is connected through the shaft 63 with the hand lever so that when this hand lever is moved rearwardly after the setting up action has been performed the pin 124 will strike the lever 118, this through the pawl 119 turning the train of gears and thus carrying on to the tens disk. There is a set of this carrying mechanism for the several number wheels of denomination above units. It will be observed that the pawl 119 is provided with two notches on its rear edge at 126, these being engaged by a spring 127 so that the said spring will not only serve to hold the pawl in engagement with its ratchet wheel but will also serve to retain the carrying mechanism, that is to say, the lever 118 and parts connected therewith in either of the positions in which they are moved. These pawls may be thrown out of operation by a rock shaft 128 having a flattened side bearing upon the tail piece of the pawl, said rock shaft being operated through an arm 129 thereon connected by a link 130 with an arm 131 on a shaft 132 journaled in suitable bearings on the frame, which shaft is operated by a pull-bar 133 connected thereto through an arm 134. These pawls are thrown out of connection with the carrying train in order to allow the adding disks to be reset to zero. The shaft 132 also has an arm 135 which is adapted to bear upon an arm 136 on the shaft 63 so as to rotate this shaft slightly when the pull-bar 133 is operated to release the pawls 119 from the carrying train and the operation of the shaft 63 slightly, will, through the train of gears above described, remove the detent bar 137 from engagement with the transmitting gears 3, this removal being due to throwing forward slightly the cam 138 which is connected with the gear 67 and which controls the position of the detent bar through the pin 139 which bears thereon, said pin being carried by an arm 140 fixed to the shaft 141 which carries the arms 142 holding the detent bar 137, this shaft being under the tension of spring 143, this detent and cam gearing being substantially the same as in the patent above referred to. It will thus be seen that both the pawls 119 and detent bar 137 is removed from the accumulator mechanism when the resetting of the number disks is to be performed.

As in the patent above referred to I provide means for resetting the number disks consisting of a finger wheel 144 on a shaft 145 passing through the number disks, said shaft having pins 146, one for each number disk, which when the shaft is moved longitudinally inward will be thrown into line with pins 147 on the number disks so that by rotating the shaft the pins thereon will strike against the pins of the number disks and return the same to normal or zero position. In order to control this resetting action so that it may be performed only when the group of selectors are lying in disengaged position at the right of the group of transmitting gears 3 and are therefore out of connection with the number disks, I provide a cam 148 connected with the gear 81 to turn therewith. The inclined surface of this cam is adapted to move rearwardly an arm 149 when it engages the end of said arm in returning to normal position and through said arm the shaft 150 is turned, which shaft has its bearings in the frame 5 of the accumulator and is under tension of a spring 151 tending to turn the shaft to move the arm 149 forwardly. The opposite end of the shaft 150 to that carrying the arm 149 has fixed thereon an arm 152 which extends with its free end close to the resetting shaft 145 and adjacent a cam or collar 153 thereon. This arm has its end adapted to obstruct the inward movement of the resetting shaft 145 by contacting with the side of the collar 153 fixed thereon when said shaft is moved inwardly. The arm 152 assumes this obstructing position as soon as the cam 148 has turned with the gear 81 at the time the selectors have moved from their disengaged position into engaged position with one or more of the transmitting gears 3. At this time it will not be possible to shift the resetting shaft inward to reset the number disks and the trains of wheels connected therewith, but when the selector wheels have been returned to their disengaged position as shown in Figs. 1 and 3 at the right of the group of number wheels and transmitting gears 3, the cam 148 will, by acting upon the arm 149, throw the arm 152 out of line with the side of the collar 153 and it will then be possible to shift the shaft 145 longitudinally by means of the finger wheel 144. It will thus be seen that the resetting mechanism is controlled by the position of the selectors as to whether they are in engaged or disengaged relation to the transmitting gears and number disks.

It will be observed from the above that I have provided an adding mechanism which may be associated with the recording mechanism by simply superimposing the recording mechanism in the form of a typewriting machine upon a portion of the adding machine or its connections. I have associated with the recording machine tabulator mechanism which is arranged in the horizontal plane of the adding mechanism or a portion of such mechanism, this tabulating mechanism being so constructed and arranged that the act of superimposing the recording machine in position above the part of the adding mechanism will also position the said recording machine in relation to and in connection with the tabulating mechanism. By this arrangement I am enabled to employ a writing machine of the well known form above mentioned, as sold upon the market, and simply apply it to my adding mechanism and to the tabulating mechanism with practically no change in the said writing machine. This tabulating mechanism comprises a disk or wheel 154 carrying a series of column stops 155 and fixed to a shaft 156 journaled in bearings 157 of the main frame work of the adding machine. On this shaft is a gear 158 which meshes with the gear 159 of the spring drum of the typewriting machine so that the shaft 156 rotates in unison with the movement of the carriage of the typewriting machine and carries with it the wheel or disk 154 having the column stops thereon. The denomination stops are provided by a block of segmental form 160 carried by a frame 161 slidably mounted on the shaft 156 and upon a rod 162 supported in the frame work. This frame 161 has a rack 163 with which meshes a gear wheel 164 on a shaft 165 journaled in bearings 166 of the adding machine frame, the said shaft having thereon a gear 167 meshing with a segment 168 on a shaft 169 suitably mounted in the frame work. The segment 168 is connected by a link 170 with a lever 171 pivoted to the frame work and having a pointer 172 moving over a scale 173 which bears the marks of units, tens, hundreds, thousands etc. The shaft 165 carries an arm or a cam 174 fixed thereto, which acts upon a release lever 175 pivoted on the shaft 169, said release lever acting against the ordinary releasing means of the Hammond typewriter which controls the connection between the paper carriage and the escapement mechanism, this releasing device consisting of the yoke or member 176 which when slid to the right, Fig. 2, will release the carriage from its escapement mechanism and place it under the influence of the carriage spring alone so that the said carriage will be impelled by the said carriage spring until arrested by the tabulator stop, which in the present instance consists of the projections 155 on the wheel 154 and the shoulders or stops 177 on the segment 160, the said shoulders being arranged in stepped form and individually corresponding in position to the different denominations.

From the above construction it will be seen that when the carriage is positioned at the proper column and the hand lever 171 is operated the link 170 through the segment 168 will turn the shaft 165, which will through the gear 164 move the frame 161 together with the stop segment 160 so that the particular shoulder 177 on the said stop which corresponds to the denomination or point on the scale 173 to which the pointer 172 has been moved, will be positioned in the path of movement of the projection 155 on the stop wheel 154 so that the movement of the carriage will be arrested by this stop, striking the appropriate shoulder on the stop 160, it being understood that the rotation of the shaft 165, when the hand lever 171 is moved, not only positions the segmental stop 160 properly but also effects the release of the carriage from its escapement by causing the arm or cam 174 to operate the arm or lever 175, which acting upon the slide or yoke 176 causes the carriage to be released from its escapement and to run freely under the action of its carriage spring until the stop 155 strikes the shoulder on the segment 160.

As before stated the stop 160 is of segmental form, it being curved concentric with the periphery of the stop wheel 154 and all of its stop shoulders are equally distant from the axial line of the wheel 154. The shouldered or stepped edge of the stop segment 160 as seen in the plan view presents a series of stops or shoulders which will allow the stop 155 to have different degrees of movement before being arrested according to the lateral position of the said stop segment in respect to the stop wheel 154.

The tabulator mechanism just described is returned to normal position when the hand lever 171 is released by a spring 179.

It will be seen from the above that all of the tabulator mechanism is arranged on the adding machine frame and below the recording machine, so that it is only necessary to superimpose the recording machine upon the adding mechanism in order to connect up the tabulator with the adding mechanism.

I claim as my invention:—

1. In combination in an adding machine, adding disks, a series of selectors rotatable about a horizontal axis, a stop arm connected with the said selectors to rotate therewith, a series of pins arranged to be projected horizontally into the path of the said stop arm, key levers and connections between the said key levers and the said pins for projecting them, substantially as described.

2. In combination in an adding machine, adding disks, a series of selectors revoluble about a horizontal axis, a stop arm connected with said selectors, a series of horizontally slidable pins, a series of key levers, vertically extending levers for operating the pins and means for operating the vertically extending levers from the key levers, substantially as described.

3. In combination in an adding machine, the number disks, a series of selectors for operating the same, a stop arm connected with the selectors, a series of pins to be projected into the path of the stop arm key levers and connections between the said key levers and the said pins comprising the bell-crank levers, the links, and the levers interposed between said links and the pins, substantially as described.

4. In combination, a series of number disks, a series of selector wheels disposed about the horizontal axis, a stop arm connected with the selector wheels, a series of horizontally movable pins to be projected into the path of the stop arm, a series of key levers arranged to one side of the selectors and stop pins and connections between the said key levers and the said stop pins, substantially as described.

5. In combination with a series of number disks, a series of selectors having rotary movement and axial shifting movement, a stop arm in connection with the selectors having rotary movement only, a series of stop pins arranged to be projected individually into the path of the said stop arm, key levers and connections between the said key levers and the said pins, substantially as described.

6. In combination the number disks, a series of selectors arranged to occupy a normally disengaged position to one side of the number disks, said selectors being revolubly mounted and also slidable axially, a stop arm arranged at the end of the series of selectors opposite to that adjacent which the number disks are located, said stop arm having rotary movement only and being connected with the selectors, a series of stop pins to individually arrest the stop arm, key levers and connections from the said key levers to the said stop arm, substantially as described.

7. In combination with the digit carriers, keys, selectors, means whereby upon the operation of the keys the selectors will be turned and shifted laterally to get into connection with the digit carriers, means for turning the selectors back to normal position to thereby set up the number onto the digit carriers, and means for shifting the selectors out of connection with the digit carriers to thereby eliminate the returning action of the selectors in respect to the digit carriers, substantially as described.

8. In combination in apparatus of the class described, carriers for the digits, selectors, key connections thereto for turning the selectors, escapement mechanism for shifting the selectors after they are turned, means for rotating the selectors to normal position to thereby set up the number, and means for re-shifting the selectors before returning to eliminate their action in respect to the digit carriers, substantially as described.

9. In combination, the digit carriers, a series of selectors, key controlled means for rotating and shifting the selectors into connection with the digit carriers, means for operating the selectors for setting up the digits on the carriers and means for shifting the selectors out of connection with the digit carriers and into line with the spaces between them for eliminating their further action in respect to the digit carriers, substantially as described.

10. In combination the digit carriers, a series of selectors, key controlled means for turning and shifting said selectors, a carrier rack therefor, a returning gear meshing with the rack, a manually operated lever, connections to operate upon said gear operated by said lever, means also operated by said lever to rotate the selectors back to normal position to thereby set up the number, and a manually operated device for shifting the selector carriage to disconnect the selectors from digit carriers whereby their return movement to normal position will be ineffective on the digit carriers, substantially as described.

11. In combination the digit carriers, a series of selectors, key controlled means for turning and shifting said selectors, a carrier rack therefor, a returning gear meshing with the rack, a manually operated lever, connections to operate upon said gear operated by said lever, means also operated by said lever to rotate the selectors back to normal position to thereby set up the number, and a manually operated device for shifting the selector carriage to disconnect the selectors from digit carriers whereby their return movement to normal position will be ineffective on the digit carriers, said manually operated device consisting of the finger lever having a limited movement and the connections controlled thereby, substantially as described.

12. In combination the digit carriers, a series of selectors, key controlled means for turning and shifting said selectors, a carrier rack therefor, a returning gear meshing with the rack, a manually operated lever, connections to operate upon said gear operated by said lever, means also operated by said lever to rotate the selectors back to normal position to thereby set up the number, and a manually operated device for shifting the selector carriage to disconnect the selectors from digit carriers whereby their return movement to normal position will be ineffective on the digit carriers, said manually operated device consisting of the finger lever having a limited movement and the connections controlled thereby consisting of the pawl, the ratchet, the shaft and the gear on the shaft, substantially as described.

13. In combination, in apparatus of the class described, adding mechanism, keys and key levers therefor, recording mechanism, keys and key levers therefor, connections between the adding key levers and the recording key levers and compensating means associated with said connections, substantially as described.

14. In combination in apparatus of the class described, adding mechanism, keys and key levers therefor, recording mechanism, keys and key levers therefor, connections between the adding key levers and the recording key levers and compensating means associated with said connections, said compensating means including yielding members, substantially as described.

15. In combination in apparatus of the class described, adding mechanism, keys and key levers therefor, recording mechanism, keys and key levers therefor and yieldingly mounted levers between the two sets of key levers and connected with both, for transmitting the movement of the key levers of one set to those of the other set and for compensating for any irregularities in the adjustment of the connections, substantially as described.

16. In combination, the adding mechanism, the recording mechanism, a set of key levers for each mechanism, a series of levers pivotally and yieldingly mounted at their front ends in the frame, and connections between the rear ends of said levers and the two sets of key levers, substantially as described.

17. In combination, adding mechanism, recording mechanism, a set of key levers for each mechanism, connections between the two sets of key levers, and adjustable compensating means between said sets of key levers, substantially as described.

18. In combination with the number disks, the carrying mechanism comprising the gear wheels connected with the number disks, the ratchet wheels for operating the gear wheels the pawls engaging with the ratchet wheel, the levers pivotally carrying the pawls, means for setting said levers in position for operation, a pin drum for operating the levers, said pawls having each a pair of notches in its rear edge and a spring for engaging the said notches, substantially as described.

19. In combination with the accumulator mechanism including the number disks and the pawls and the carrying trains, detent means for holding the number disks in position, means for resetting the number disks, means for throwing the pawls out of operation for performing the resetting action, said means including the shaft 132 and the rock shaft connected therewith for operating the pawls and a connection from the shaft 132 for operating the detent means to free the number disks therefrom for the resetting action, substantially as described.

20. In combination, the number disks, selectors for engaging and operating the same, keys with connections to said selectors for turning the same and shifting them axially, a hand lever with connections for returning the selectors to normal position to thereby operate the number disks, detent means operated from the said manually operated connections for releasing the number disks, carrying mechanism including pawls, resetting mechanism for resetting the number disks, a hand operated device with connections to the pawls for releasing them to enable the resetting action to be performed and means operated from the connections last mentioned for operating the connections leading to the detent means for freeing the same from the number disks, substantially as described.

21. In combination with the number disks, the selectors having axially shifting movement to connect with and disconnect from the said number disks, resetting means including a longitudinally operating shaft which is adapted also to turn and reset the number disks and means for controlling the operation of said resetting shaft, said means being controlled in turn in accordance with the position of the selectors to permit or allow the resetting mechanism to be operated, substantially as described.

22. In combination with the number disks, the selectors arranged to move axially into and out of connection with the number disks, resetting means for the number disks, controlling means for the resetting means and means movable with the selectors to operate the controlling means so as to permit or obstruct the movement of the resetting means, substantially as described.

23. In combination with an adding mechanism, recording mechanism superimposed upon a portion of the adding mechanism, a tabulator mechanism arranged to be connected or associated with the recording mechanism by having the said recording mechanism superimposed thereupon, substantially as described.

24. In combination with the adding mechanism, recording mechanism superimposed upon a portion of the adding mechanism and tabulating mechanism arranged in the same horizontal plane with the portion of the adding mechanism upon which the recording mechanism is superimposed, said recording mechanism having a paper carriage and the said tabulator mechanism controlling the same, substantially as described.

25. In combination in a machine of the class described, a paper carriage, a gear wheel rotating in unison with the movement of the paper carriage, a stop carrying wheel, a shaft carrying the same and having a gear meshing with the gear first mentioned, a sliding member having a stepped segmental stop, the shoulders or stops of which coact with the projections on the stop wheel, means for shifting said sliding stop and means for simultaneously releasing the paper carriage from its escapement mechanism, substantially as described.

26. In combination with the paper carriage, the gear wheel rotating in unison with the movement thereof, a shaft geared to said gear wheel, a stop wheel on the shaft, a slidable segmental stop having a series of shoulders or stops thereon to coact with the stop wheel, a shaft, a cam on the said shaft, an arm controlled by the said cam for releasing the paper carriage from its escapement mechanism and a gear connection between the said shaft and the slidable stop for operating the same and means for operating the said shaft, substantially as described.

27. In combination in apparatus of the class described, the number disks, selector wheels, means for turning the same and shifting them axially and controlled from the keys, said axially shifting connecting the selectors with the number wheels, means for giving the selectors a further movement to set up the action of the selectors onto the number wheel and means for giving the selectors an additional shifting movement to disconnect from the number wheels so that their further movement will be ineffective on said number wheel, substantially as described.

In testimony whereof, I affix my signature in presence of two witnesses.

GEORGE WILSON DUDLEY.

Witnesses:
T. HOWARD EAKLE,
GEO. B. HOWARD.